United States Patent [19]

Murphy et al.

[11] 3,933,094

[45] Jan. 20, 1976

[54] SUBSTRATE HAVING COLORED INDICIA THEREON FOR READ-OUT BY INFRARED SCANNING APPARATUS

[75] Inventors: Joseph M. Murphy, Wilbraham; Robert E. Lafler, Charlton City, both of Mass.

[73] Assignee: United States Envelope Company, Springfield, Mass.

[22] Filed: Nov. 19, 1973

[21] Appl. No.: 417,355

[52] U.S. Cl. .................... 101/426; 35/9 G; 106/23; 209/111.5; 229/68 R; 235/61.11 E; 235/61.12 N; 250/341

[51] Int. Cl.$^2$ ......................B07C 5/342; G06K 7/12; B65D 27/00

[58] Field of Search ............. 235/61.11 E, 61.12 N; 106/23; 250/338, 340, 341; 209/111.5; 35/9 G

[56] References Cited

UNITED STATES PATENTS

| | | | |
|---|---|---|---|
| 2,350,893 | 6/1944 | Hofgaard | 197/1 |
| 2,546,666 | 3/1951 | Fleischer | 35/9 C |
| 2,612,994 | 10/1952 | Woodland et al. | 101/DIG. 12 |
| 2,751,433 | 6/1956 | Linger | 178/23 |
| 2,784,392 | 3/1957 | Chaimowicz | 340/174 |
| 2,936,247 | 5/1960 | Francis et al. | 106/23 X |
| 3,400,156 | 9/1968 | Milionis et al. | 260/576 |
| 3,440,257 | 4/1969 | Susi et al. | 260/440 |
| 3,462,285 | 8/1969 | Thompson | 117/21 X |
| 3,561,003 | 2/1971 | Lanham et al. | 106/23 X |
| 3,566,120 | 2/1971 | Lane | 250/341 X |
| 3,596,062 | 7/1971 | Street et al. | 235/61.11 E |
| 3,598,964 | 8/1971 | Dell et al. | 235/61.6 R |
| 3,705,043 | 12/1972 | Zabiak | 106/23 X |

FOREIGN PATENTS OR APPLICATIONS

| | | | |
|---|---|---|---|
| 1,228,557 | 4/1971 | United Kingdom | 101/211 |

*Primary Examiner*—Clyde I. Coughenour
*Attorney, Agent, or Firm*—McCormick, Paulding & Huber

[57] ABSTRACT

In a method for making a business reply envelope having binary bar code indicia imprinted thereon for identification or read-out by infrared scanning apparatus, the steps of providing a plurality of printing inks, each of said inks being of a color which in combination with the envelope substrate yields a Print Contrast Signal substantially less than 50 percent when measured in the wavelength range of 800 to 900 nanometers as determined by the equation Print Contrast Signal = R*w*-R*b*/R*w* *G2P* 100 wherein R*w* is the percentage reflectance of the unprinted substrate of the envelope and R*b* is the percentage reflectance of the printed area of the envelope, adding a material comprising a metallic compound to only one of said inks in quantity sufficient to increase the Print Contrast Signal of said one ink color and said substrate to at least 50 percent, imprinting at least said indicia on said substrate with said one ink, and imprinting further material on said substrate with the other of said inks.

6 Claims, 1 Drawing Figure

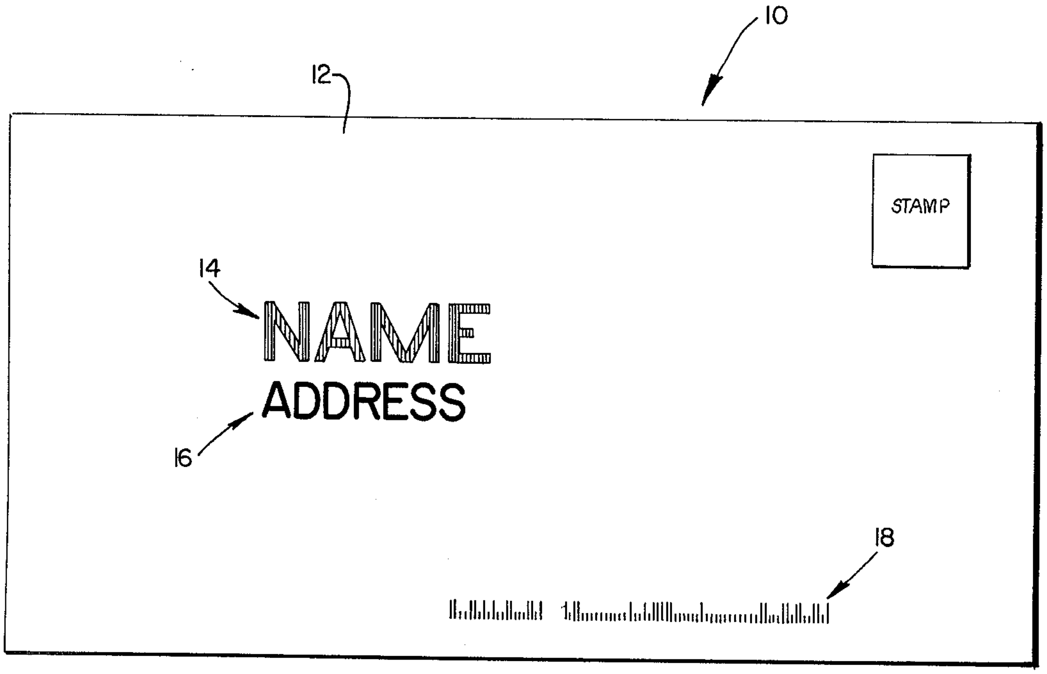
10
12
STAMP
14
NAME
ADDRESS
16
18

SUBSTRATE HAVING COLORED INDICIA THEREON FOR READ-OUT BY INFRARED SCANNING APPARATUS

BACKGROUND OF THE INVENTION

This invention relates in general to substrates having indicia imprinted thereon for read-out by infrared scanning apparatus and relates more particularly to improved methods for making coded envelopes, flexible packages, and the like printed in color and adapted for identification and/or sorting at some future time by infrared scanning apparatus.

Heretofore, methods for making envelopes, flexible packages and other items having coded information imprinted thereon for read-out by infrared scanning apparatus utilized inks which contain, as necessary ingredient, carbon black and which, as a result, were either black or of a dull hue. Where ink of a color other than black has been employed, the graduation of color has been generally determined by the concentration of carbon black pigment incorporated in the ink to provide required contrast between the printed area and the substrate. When brightly colored printing and/or printed designs were desired, as for advertising purposes, it has generally been necessary to employ printing apparatus provided with multiple printing stations. More specifically, a printing press has been required which includes one or more stations for imprinting the brightly colored materials and at least one additional station for imprinting the coded material in black or at least a dull color. The limitations imposed by the required black or dull color of the coded material detracted from the aesthetic quality of the finished product, had a detrimental effect on customer acceptance, and thereby reduced the market for such items.

Accordingly, it is the general aim of the present invention to provide improved printing materials wherein brightly colored inks are utilized in the printing process compatible with the requirements of infrared scanning apparatus used to process the item.

SUMMARY OF THE INVENTION

In accordance with the present invention, a substrate having indicia thereon for identification on read-out by infrared scanning apparatus is provided and made by a method which comprises the steps of adding a colored pigment to a colored ink having a ratio of reflectance less than 50 percent as compared with the reflectance of the substrate to increase the aforesaid reflectance ratio to at least 50 percent when measured within the wavelength range of 800 to 900 nanometers and imprinting the indicia on the substrate with the ink after the colored pigment has been added thereto. The ink is used to imprint at least the indicia but may be used to imprint other matter on the substrate after the colored pigment has been added thereto.

BRIEF DESCRIPTION OF THE DRAWING

The drawing shows a front view of a business reply envelope having a bar code thereon and printed in accordance with the method of the present invention.

DETAILED DESCRIPTION OF PREFERRED EMBODIMENTS

In accordance with the broad concept of the invention, a method is provided for imprinting colored material on a substrate and which includes indicia for identification by infrared scanning apparatus sensitive to radiation in the wavelength range of from 800 to 900 nanometers. Ideally, it is desirable to attain the highest possible reflectance from the substrate and the lowest possible reflectance from the indicia thereon in the aforesaid wavelength range to assure sensing of the indicia by the scanning apparatus. This difference in reflectivity is called contrast and may be further expressed as a print contrast ratio or print contrast signal which will be hereinafter further discussed. Where there is insufficient contrast between the substrate and the indicia thereon, as for example, where brightly colored inks are employed to imprint the indicia, the scanning apparatus will not provide satisfactory response to identify or read the indicia. In accordance with the present method, a material containing a metallic compound is added to the ink used to imprint the indicia to impart to the ink the required absorbance in the near-infrared range to assure scanner response. However, when a brightly colored ink is used, the added material does not cause the ink to assume a dull or dark hue as is the usual result when a sufficient quantity of carbon black is added to impart the desired absorbance.

Referring now to the drawing, a method of the present invention is illustrated and described with reference to a business reply envelope indicated generally at 10. The envelope 10 has a front panel 12 which includes an address area bearing the name and address of a recipient, the name being indicated at 14 and imprinted in one color and the address being designated at 16 and imprinted in another color. Indicia or coded material designated generally at 18 is imprinted in a clear read zone, free of any extraneous printing, and spaced from the bottom and righthand edge of the envelope front panel 12. The illustrated coded material 18 is preferably printed in either the color of the name 14 or the color of the address 16 and comprises an indicia bar code of a type approved by the U.S. Postal Service. The illustrated bar code 18 comprises a horizontal series of vertically elongated bars printed in a predetermined arrangement to impart binary code information. More specifically, the bars include long bars which represent one bits and short bars or zero bits of binary information. The bar code 18 will not be discussed in detail, however, it provides a considerable amount of detailed data which may, for example, include such information as a recipient's postal zip code, his street address, house number and name, and such additional information as may be required to properly sort and full process the envelope. Before considering the instant methods for imprinting the material on the envelope 10, the equipment used for reading the code 18 will be briefly described.

The Standard Bar Code Scanner ("Single Position Machine") presently employed by the U.S. Postal Service for reading bar codes, such as the code 18, comprises a light source which is beamed into the read zone of an envelope. The radiant energy reflected from the envelope paper and the code imprinted thereon passes through a preselected filter and is thereafter converted to electrical energy by a transducer, which may, for example, comprise a photodiode, whereby the code is read by the apparatus in a manner well known in the art. In the present instance, the chosen spectral response of the apparatus has an 850 nanometer peak, which is in the near infrared range.

A fundamental requirement of an infrared sensing apparatus or bar code scanner, such as aforedescribed, is that there be adequate contrast between the envelope paper which comprises the substrate and the indicia or bar code. As previously noted, the optimum condition exists where there is maximum reflectivity from the paper and minimum reflectivity from the printed material thereon to be sensed by the scanning apparatus.

The contrast between the reflectivity of the paper and the reflectivity of the printed material thereon is expressed as a Print Contrast Signal (PCS). A PCS value is obtained by a simple equation:

$$PCS = \frac{Rw - Rb}{Rw} \times 100$$

wherein R*w* is the percentage of light reflected by the paper and R*b* is the percentage of light reflected from the printed material, the latter values being obtained by the measurement of reflectances on a suitable instrument, such as a spectrophotometer. To assure adequate bar code readability, the USPS has established specifications which require that the reflectance of the paper be at least 50 percent or greater and that the Print Contrast Signal be 50 percent or greater.

At present, the USPS also employs Alpha Numeric Optical Character Readers which are capable of reading both letters of the alphabet and numerals. However, this apparatus is also capable of reading bar codes and is currently used as back-up equipment for the Infrared Bar Code Scanners. Thus, in a post office handling large quantities of bar coded business reply envelopes, an Optical Character Reader may be used to process bar coded mail if an Infrared Bar Code Scanner is not immediately available.

The Optical Character Reader presently employed in processing U.S. mail operates generally within the visible wavelength range of 400 to 700 nanometers and has a peak response at 530 nanometers. If the teachings of the present invention are to be employed in the making of business reply envelopes, it is essential that the ink/paper combinations yield a Print Contrast Signal of at least 50 percent when measured in the wavelength range of 400 to 700 nanometers and as determined by the aforesaid PCS equation. However, the present invention is more immediately concerned with methods of printing envelopes and the like which satisfy the requirements of the infrared scanning apparatus such as the bar code reader aforedescribed.

In accordance with the method of the present invention, printing ink is provided of a color which in combination with the envelope substrate yields a Print Contrast Signal less than 50 percent when measured in the wavelength range of 800 to 900 nanometers and as determined by the aforesaid PCS equation. Flexographic and oil based ink compositions of bright color are preferred in practicing the invention. Further, and in accordance with the invention, material comprising a metallic compound is added to the colored ink used to imprint the bar code 18 to increase its infrared absorbent qualities without appreciably darkening or dulling it. The material to be added to the ink may contribute as a colorant. Therefore, the amount of material to be added may be determined, at least to some degree, by the shade of ink desired. If necessary, titanium dioxide, usually added in the form of a pigment dispersion, may be used to lighten the color. It has been found that material comprising a metallic compound containing iron may be used as an ink additive and permits the use of inks in a wide range of colors which provide satisfactory read-out in infrared scanning apparatus operating in the aforesaid range, as for example, Iron oxide $Fe_2O_3$. Both inorganic and metallo-organic compounds containing iron have proven highly satisfactory.

Certain pigments comprising iron compounds have been suitable for effecting desired improvement in the infrared absorption characteristics of ink used in practicing the invention and include the following pigments further identified by Colour Index Number in Colour Index Volume 3, Second Edition, 1957, American Association of Textile Chemists and Colorists:

Iron Blue—Pigment Blue 27—Colour Index No. 77510 a complex ferric ferrocyanide with the approximate composition $FeK\{Fe(CN)_6\}$ cited on p. 3621 of Colour Index as being:

$Fe_4'''\{Fe''(CN)_6\}_3 \cdot x\,H_2O$ or $Fe'''\{Fe''Fe'''(CN)_6\}_3 \cdot x\,H_2O$ commonly called: Prussian Blue — violet undertone.

Milori Blue (lighter in hue and softer in texture than Prussian Blue)

Gas Blue

Chinese Blue — greenish undertone

Bronze Blue — bronzy sheen

Steel Blue — greenish variety

Antimony Blue

C.I. Pigment Green 8 Colour Index No. 10006

The use of Pigment Blue 27, Colour Index 77510 or Milori Blue as an ink additive in practicing the invention has yielded most satisfactory results. Incorporation of this pigment into inks reduces the R*b* values of the printed ink films to a satisfactory degree without imparting an objectional dull tone to the ink.

EXAMPLE

Two samples of PMS 285 blue were made. Sample A was formulated as follows:

| | |
|---|---|
| 5-S-28 Blue Dye | 22.80% |
| 5-S-29 Blue Dye | 9.20% |
| Varnish | 28.00% |
| Solvent | 40.00% |
| | 100.00% |

Sample B was formulated as follows:

| | |
|---|---|
| 5-S-28 Blue Dye | 4.60% |
| 5-S-32 Blue Dye | 2.30% |
| Milori Blue Dispersion | 29.00% |
| Varnish | 29.00% |
| Solvent | 35.10% |
| | 100.00% |

The resultant reflectance values at 850 Nm. on identical white wove paper were as follows:

| Sample A | Rw | Rb | PCS |
|---|---|---|---|
| | 81% | 73% | 11% |
| Sample B | 81% | 27% | 66% |

The effect of the Milori Blue in lowering the R*b* value, thereby yielding a satisfactory PCS of 66% is apparent.

Similar tests with inks of other colors and using Pigment Blue 27, Colour Index 77510 or Pigment Green 8, Colour Index 10006 also yielded highly satisfactory results.

However, it should be understood that since the aforesaid pigments alter the color of an ink the amount of pigment to be added to a given ink will be determined, at least in part, by the shade of ink desired.

Compounds of the following formula have also proven satisfactory as ink additives in practicing the invention:

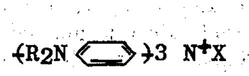

wherein R is an alkyl of 2 to 5 carbon atoms and $X^-$ is an anion selected from the group consisting of hexafluoroantimonate or hexafluoroarsenate.

Such compounds are manufactured and marketed by American Cyanimid Company under U.S. Pat. Nos. 3,400,156 and 3,440,257 and identified as CYASORB H–99, H–177 and H–165. The aforesaid compounds are provided for use where it is desired to protect against potentially injurious infrared radiation, as for example, for use as infrared absorbers in protective optical filters such as sunglasses, welder's goggles, window glass and the like. The aforesaid compounds are particularly suitable for use in organic plastic substrates used in the manufacture of items of the aforedescribed kind.

The use of CYASORB H–99 has yielded most satisfactory results. Incorporation of this compound into alcohol-based dye inks reduces the R*b* values of the printed ink films to a satisfactory degree without any substantial change in the visible shade of the ink when compared to a control sample not having the additive.

EXAMPLE

Two four-pound samples of dye-based PMS 192 red were laboratory manufactured. To one of the four-pound samples four ounces of H–99 absorber was added under high speed agitation. The other four-pound sample was unaltered and used as a control.

Both inks were adjusted to 18 seconds viscosity with a No. 2 Zahn Cup.

Both inks were printed on the same lot of 24 White Wove paper on the same press, the control being run first.

Reflectance values taken at 850 Nm. on a Macbeth Model I Spectrophotomer were as follows:

| PMS 192 Control | Rw | Rb | PCS |
|---|---|---|---|
| | 81% | 77% | 5% |
| PMS 192 + H-99 | 81% | 13% | 84% |

As is indicated, the use of the H–99 reduced the R*b* values to 13%, thereby yielding a PCS value above 50%, namely 84%.

Sample inks PMS 199 Red, PMS 285 Blue, PMS 354 Medium Green and PMS 375 a Light Green, have been successfully formulated with H–99 rendering them readable at 850 Nm. when printed on 24 White Wove envelope paper. Control samples of the same inks without the H–99 additive did not pass because of their high reflectance values at 850 Nm.

We claim:

1. A substrate having indicia thereon for read-out by infrared scanning apparatus and made by a method comprising the steps of providing a printing ink of a color which in combination with the substrate yields a Print Contrast Signal substantially less than 50 percent when measured in the range of 800 to 900 nanometers as determined by the equation $$\text{Print Contrast Signal} = \frac{Rw-Rb}{Rw} \times 100$$

where R*w* is the percentage reflectance of the unprinted substrate and R*b* the percentage reflectance of the printed area, adding a pigment dispersion comprising Pigment Blue 27 — Color Index 77510 to said ink in quantity sufficient to increase said Print Contrast Signal to at least 50 percent when measured within said range, and imprinting said indicia on said substrate with said ink after said material has been added thereto.

2. A business reply envelope having indicia thereon for identification by infrared scanning apparatus, made by a method comprising the steps of providing at least one printing ink of a color which in combination with the envelope substrate yields a Print Contrast Signal substantially less than 50 percent when measured in the range of 800 to 900 nanometers as determined by the equation $$\text{Print Contrast Signal} = \frac{Rw-Rb}{Rw} \times 100$$

where R*w* is the percentage reflectance of the unprinted envelope substrate and R*b* is the percentage of reflectance of the printed area of the envelope substrate, adding a pigment dispersion comprising Pigment Blue — Color Index 77510 to said one ink in quantity sufficient to increase the Print Contrast Signal of said one ink color and said substrate to at least 50 percent, and imprinting said indicia on one portion of said substrate and additional matter on another portion of said substrate with said one ink.

3. A business reply envelope as set forth in claim 2 wherein after the step of imprinting said indicia the combination of said substrate and said indicia has a Print Contrast Signal not less than 50 percent when measured in the range of 400 to 700 nanometers as determined by said equation.

4. A substrate having indicia thereon for read-out by infrared scanning apparatus and made by a method comprising the steps of providing a printing ink of a color which in combination with the substrate yields a Print Contrast Signal substantially less than 50 percent when measured in the range of 800 to 900 nanometers as determined by the equation $$\text{Print Contrast Signal} = \frac{Rw-Rb}{Rw} \times 100$$

where R*w* is the percentage reflectance of the unprinted substrate and R*b* the percentage reflectance of the printed area, adding a pigment dispersion comprising Pigment Green — Color Index 10006 to said ink in quantity sufficient to increase said Print Contrast Signal to at least 50 percent when measured within said range, and imprinting said indicia on said substrate with said ink after said material has been added thereto.

5. A business reply envelope having indicia thereon for identification by infrared scanning apparatus, made by a method comprising the steps of providing at least one printing ink of a color which in combination with the envelope substrate yields a Print Contrast Signal substantially less than 50 percent when measured in the range of 800 to 900 nanometers as determined by the equation $$\text{Print Contrast Signal} = \frac{Rw-Rb}{Rw} \times 100$$

where R*w* is the percentage reflectance of the unprinted envelope substrate and R*b* is the percentage of reflectance of the printed area of the envelope substrate, adding a pigment dispersion comprising Pigment Green — Color Index 10006 in quantity sufficient to increase the Print Contrast Signal of said one ink color and said substrate to at least 50 percent, and imprinting said indicia on one portion of said substrate and additional matter on another portion of said substrate with said one ink.

6. A business reply envelope as set forth in claim 5 wherein after the step of imprinting said indicia the combination of said substrate and said indicia has a Print Contrast Signal not less than 50 percent when measured in the range of 400 to 700 nanometers as determined by said equation.

* * * * *

UNITED STATES PATENT AND TRADEMARK OFFICE

CERTIFICATE OF CORRECTION

PATENT NO. : 3,933,094

DATED : January 20, 1976

INVENTOR(S) : Joseph M. Murphy and Robert E. Lafler

It is certified that error appears in the above-identified patent and that said Letters Patent are hereby corrected as shown below:

In the ABSTRACT, line 10, "Rw-Rb/Rw G2P 100" should read --Rw-Rb/Rw x 100--.

Signed and Sealed this

*thirteenth* Day of *April 1976*

[SEAL]

*Attest:*

RUTH C. MASON
*Attesting Officer*

C. MARSHALL DANN
*Commissioner of Patents and Trademarks*